United States Patent

[11] 3,597,043

[72] Inventor John F. Dreyer
Cincinnati, Ohio
[21] Appl. No. 821,444
[22] Filed May 2, 1969
[45] Patented Aug. 3, 1971
[73] Assignee Polacoat Incorporated
Cincinnati, Ohio

[54] NEMATIC LIQUID CRYSTAL OPTICAL ELEMENTS
19 Claims, 5 Drawing Figs.

[52] U.S. Cl............................................. 350/149,
350/150, 350/151, 350/157
[51] Int. Cl............................................ G02f 1/24
[50] Field of Search............................ 350/149,
150, 151, 160, 161, 160 R

[56] References Cited
UNITED STATES PATENTS
3,257,903 6/1966 Marks........................... 350/150
3,364,433 1/1968 Freund et al.................. 350/150 UX
3,499,112 3/1970 Heilmeier et al. ............ 350/160 X OTHER REFERENCES
Elliott et al., " Domain Structures in Liquid Crystals Induced by Electric Fields," Nature Vol. 205 (March 6, 1965) pp. 995— 996.
Chapman, " Liquid Crystals," Science Journal, Vol. 1, No. 8 (Oct. 1965) pp. 32— 38.
" Liquid Crystal Work Cuts Time to Large Scale Electronic Uses," Chem. & Eng. News (Sept. 30, 1968) pp. 32— 33.
Pinsky, " Reflective Liquid-Crystal Displays," Electronics World (Nov. 1968) pp. 29 & 58.

Primary Examiner—David Schonberg
Assistant Examiner—Paul R. Miller
Attorney—Melville, Strasser, Foster & Hoffman ABSTRACT: The production of visible motion patterns in a thin film of a nematic liquid crystal compound by inducing physical movement of the film, the film being formed between support plates at least one of which is transparent or translucent, means being provided to effect movement within the liquid crystal film.

INVENTOR/S
JOHN F. DREYER

BY *Melville, Strasser, Foster and Hoffman*
ATTORNEYS

NEMATIC LIQUID CRYSTAL OPTICAL ELEMENTS

BACKGROUND OF THE INVENTION

This invention relates to optical elements utilizing compounds which have an optically active nematic liquid crystalline phase, or a mesomorphic phase as it is often called. Materials having a mesomorphic phase do not pass directly from the solid to the liquid state upon being heated, but rather have an intermediate state in which the materials are neither true solids nor true liquids. Such materials are generally referred to as liquid crystals. The nematic materials, when in the mesomorphic phase, have the useful property of high light dispersion when under the influence of an electric potential or a strong magnetic field. Thus, as taught in *Chem. and Engr. News* Vol. 32, page 2962—3, 1954, and *Zeits. Phys. Chem.* Vol. 142, page 186, 1929, various organic nematic compounds may be formed into thin layers and subjected to an electric field, the selective application of the field serving to change the light reflective or light transmissive properties of the nematic compounds, thereby making possible various optical display devices.

While it has hitherto been believed that an electric potential or magnetic field had to be applied directly to the organic nematic compound in order to change its light transmissive or light reflective properties, it has now been discovered that visible motion patterns can be induced in a thin layer of nematic liquid crystals by effecting physical movement of the layer itself, or of portions thereof. Thus, it has been discovered that a thin film of a nematic liquid crystal material formed between transparent supporting plates will change its birefringence when either of the plates is moved, provided the surface of one of the plates in contact with the liquid crystal film has been treated with a substance which will remove any effect of surface orientation of the supporting plates. It has been found that the resultant change in birefringence is extremely sensitive to any motion induced through the supporting plates, and consequently a whole new field of optical elements has been made available which have utility in a wide number of applications.

RESUME OF THE INVENTION

In accordance with the invention, optical elements can be produced by forming a thin film of a nematic liquid crystal compound between supporting plates, whereupon any movement of the supporting plates which results in physical movement of the liquid crystal layer acts to produce visible motion patterns, the phenomenon apparently being one wherein the birefringence of the nematic liquid crystal compound is changed by the stretching, compression or flowing of the liquid crystal compound induced by movement of its supporting surfaces. In other words, the change in birefringence is directly induced by mechanical energy, although such mechanical energy itself may be induced by other forms of energy, the supported liquid crystal film acting as an extremely sensitive transducer converting the mechanical energy into a visible motion pattern.

Optical elements in accordance with the invention may be used as a means to detect the presence of any of the forms of energy which may be converted into mechanical energy, inclusive of electric, magnetic and acoustic energy, or to detect changes in any of the forms of energy which may be converted into mechanical energy. Such elements also may be utilized to measure the intensity of the applied energy and to create a visual pattern informative of the character of the energy applied. Thus, for example, by constituting one of the supporting surfaces for the liquid crystal film a flexible diaphragm capable of responding to acoustic vibrations, such vibrations can be converted into a visual pattern which corresponds to the vibrations. Similarly, if one of the support plates comprises a piezoelectric material, such as quartz or Rochelle salt, and an electric potential is applied to the piezoelectric material, the resultant movement will produce visible motion patterns in the liquid crystal film which will change when the character of the applied voltage is changed.

When the nematic compound is colorless and both supporting plates are light transmissive, the change in birefringence can be visibly observed by placing the liquid crystal compound between light polarizing filters. Where the compound is dichroic, or where one of the supporting plates is reflective, only one light polarizer is required to show the motion pattern effect. If cholesteric compounds are used, the interference colors produced at specific temperatures within the mesomorphic phase will be superposed on the motion pattern effect, and polarizers are not required to observe the interference colors or the motion pattern effect.

The invention also contemplates the impression of predetermined designs or indicia on the surface of one or part of one of the supporting plates which will become visible when the motion pattern effect takes place. However, it has been discovered that adjacent areas of at least one of the supporting surfaces must be free from surface orientation, inclusive of such orientation as results from finishing, polishing or even cleaning of the surface, since the resultant orientation interferes with, or even destroys, the motion pattern effect. To overcome this difficulty at least one of the supporting surfaces is treated with a material which effectively forms a lubricating layer between the supporting plate and the liquid crystal film.

DESCRIPTION OF THE PREFERRED EMBODIMENTS

There are numerous organic nematic compounds which are suitable for use in practicing the invention, and the liquid crystals can be a transparent or translucent thermotropic colorless material, such as p-n-proproxy benzoic acid, or a colored material such as anisal-alpha-benzol-azo-alpha-napthylamine. Lyotropic compounds, such as bromophenanthrene sulfonic acid, or amaranth in proper concentration with a solvent, also may be employed. Eutectic mixtures of the organic nematic compounds may also be employed. While many of the organic thermotropic nematic compounds must be maintained at an elevated temperature, i.e., above room temperature, in order for them to exhibit the nematic mesophase, a number of recently discovered nematic compounds, such as anisylidene p-aminophenyl n-butane, are optically active at temperatures as low as 0° C. Additional examples of nematic compounds which exhibit the nematic mesophase at relatively low temperatures will be found in a copending application Ser. No. 817,143 in the name of Elwood Strebel, filed Apr. 17, 1969, and entitled "Organic Thermotropic Nematic Compounds." Such compounds, which comprise parasubstituted alkyl or alkoxy benzylidenephenylamines having also para, or ortho and para substituents of the phenylamine ring, are particularly suited for the practice of the instant invention in that they have low viscosities and can be readily handled and formed into thin films. Other organic thermotropic nematic materials, such as those disclosed in U.S. Pat. 3,322,485, issued May 30, 1967, also may be employed.

Figure 1:
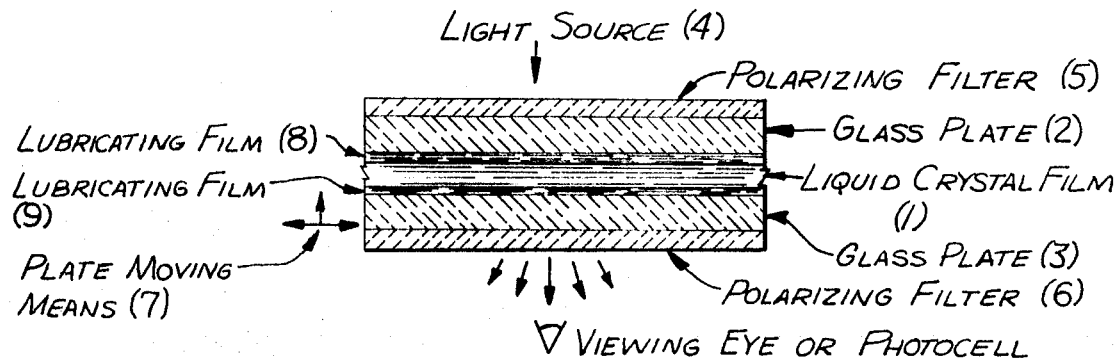
FIG. 1 is a schematic sectional view of an optical element embodying the invention wherein the light is transmitted through a pair of light transmissive supporting plates and a pair of polarizing filters.

FIG. 1 of the drawing illustrates an optical element in which the film 1 of nematic liquid crystals lies between transparent or translucent supporting plates 2 and 3, which may comprise glass or a plastic material. Since light from the light source 4 will pass through the element, polarizing filters 5 and 6 will be provided on opposite sides of the liquid crystal film 1. These light polarizing filters do not have to be in a crossed position; the plane of polarization of one can be at any desired angle with respect to the plane of polarization of the other, depending upon the amount of light to be transmitted. In instances where the liquid crystal compound is dichroic, only one filter, usually the filter 6, is required to show the motion pattern generated when one or both of the plates is moved. A plate moving means is indicated at 7, it being understood that such means will comprise a vibrator or other means capable of effecting movement of the plates relative to each other and to the interposed film of liquid crystals. Various means for effecting movement of the plates will be discussed hereinafter in conjunction with the several embodiments of the invention.

The thickness of the liquid crystal film may vary depending upon the effect desired. If the film has a thickness of about one-half mil or less, color patterns will be produced ranging through the spectrum from red to blue. Above about 1 mil, the patterns will tend to be essentially monochromatic, depending usually on the basic color of the polarizing filters. For example, if the polarizers are of neutral gray color, gray and white patterns will be produced. Similarly, if the polarizers are of a rose tint, the patterns will vary from near white to dark rose. For practical purposes, film thicknesses up to about 10 mils produce excellent results and the applied films are normally colorless, although as previously indicated, the films may be colored depending upon the visual effects desired.

It has been found, however, that it is essential to the production of visible motion patterns that at least one, and preferably both, of the film contacting surfaces of the supporting plates be treated with a lubricating material which will remove the effects of surface orientation of the plates. For example, if the plates are rubbed or polished, or even cleaned, it has been found that a surface orientation results in the direction or directions in which the plates were rubbed, and that such surface orientation, in addition to being visible when the motion patterns are generated, will interfere with the generation of the motion patterns and, in some instances, will preclude their formation. Some form of such surface orientation appears to inherently exist in all forms of supporting plates, whether they are of glass, plastic or metal. It has been found that the effects of such surface orientation can be eliminated by providing thin films 8 and 9 of a lubricant at the interfaces of the plates and the liquid crystal film. A preferred lubricating material comprises a cationic wetting agent which will be adherent to the surfaces of the plates and at the same time nonabsorbent with respect to the liquid crystal film. Excellent results have been obtained using Intercol R A, which is a long chain fatty acid amide containing multiple amine groups, manufactured by Synthetic Chemicals, Inc. Other satisfactory wetting agents are Sotex 45 A, also manufactured by Synthetic Chemicals, Inc.; Quaternary 0, which is a quaternary amine manufactured by Geigy Chemical Corporation; and Perma-Par-K, which is a substituted long chain secondary amine, produced by Refined Products Inc. While not considered a cationic wetting agent, lecithin has also been found to be suitable as a lubricant for the liquid crystal film. Essentially, the function of the wetting agent is the formation of a molecular layer which will be attracted to the surface of the plates, which will not be dissolved or absorbed by the liquid crystal film, and which will act as a lubricant at the interface of the liquid crystal film and the supporting plates.

While in many applications the film contacting surfaces of both supporting plates will be treated with the wetting agent, particularly where it is desired to prevent surface orientation of either plate from being imposed on the motion pattern, additional optical effects can be produced by intentionally forming rubbed patterns on the surface of one of the plates. For example, the plate may be rubbed, scratched or etched to provide fixed pattern or design which will become visible when physical movement is imparted to the liquid crystal film and it is viewed using two light polarizers in the case of colorless liquid crystal compounds and one polarizer in the case where a dichroic liquid crystal compound is employed, or where one of the supports comprises a reflective surface. Thus, various types of permanent indicia, such as a picture, design, written message or the like may be formed on the surface of one of the plates which will be invisible when the liquid crystal film is in a passive state but will become visible when the film is mechanically activated, as by vibrating the plates. The rubbed pattern so formed will be superposed on the motion pattern produced by the physical movement of the plate. The rubbed pattern could be, for example, an advertising message and the motion pattern an attractive attention drawing background. Normally, the liquid crystal film will be activated by producing physical movement in the plate carrying the wetting agent rather than through the plate which is rubbed, since it appears that the rubbed portions of the plate interfere with the physical movement of the liquid crystal film which produces the motion patterns.

Figure 2:
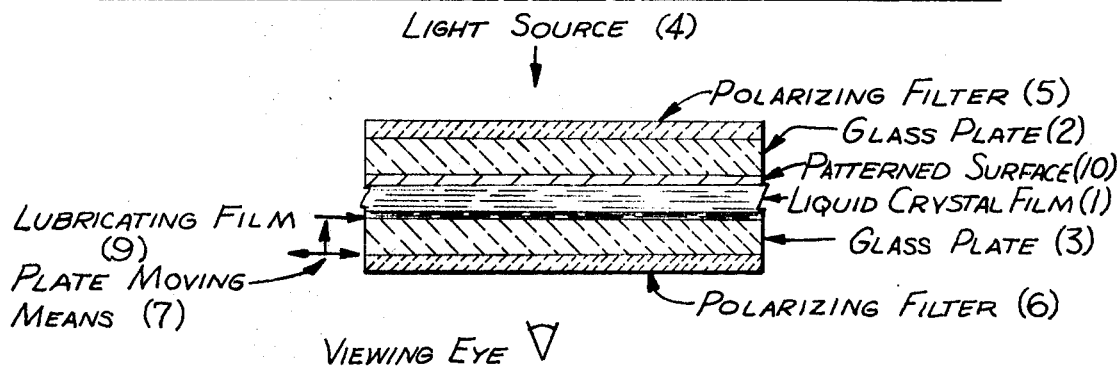
FIG. 2 is a schematic sectional view of a modification of the invention wherein the light is transmitted through a pair of light transmissive supporting plates and one of the plates has a patterned surface.

FIG. 2 of the drawing illustrates a display device of the character just described wherein the surface 10 of plate 2 is rubbed, as by means of a slurry of rouge in water, to produce the desired rubbed pattern which may comprise all or a portion of the surface of the plate. Where this is done, the lubricant will be omitted at least in the areas on which the rubbed pattern has been impressed.

Figure 3:
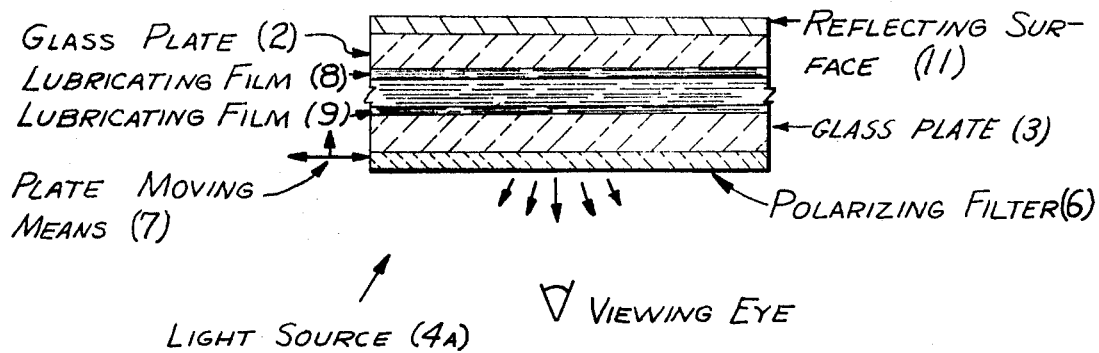
FIG. 3 is a schematic sectional view of an optical element wherein the light is reflected by the device, one of the supporting plates having a reflective surface.

Another combination is illustrated in FIG. 3 wherein one of the supporting plates 3 is transparent or translucent and the second supporting plate 2 has a reflecting surface 11, which may comprise a mirror or a reflective paint. Alternatively, the supporting plate 2 may comprise a plated or polished metallic member. While, as before, it is preferred to employ lubricating films 8 and 9, in this instance only one polarized filter 6 is required, the filter being on the side of the liquid crystal film 1 from which the element is viewed. It will be understood that in this instance, the light source will also be on the viewing side of the element, as indicated at 4a, the light rays with which the light valving action or motion effect is produced travelling through the polarizing filter and the nematic liquid crystal film where they are reflected and returned through the liquid crystal film and the polarizer.

Figure 4:
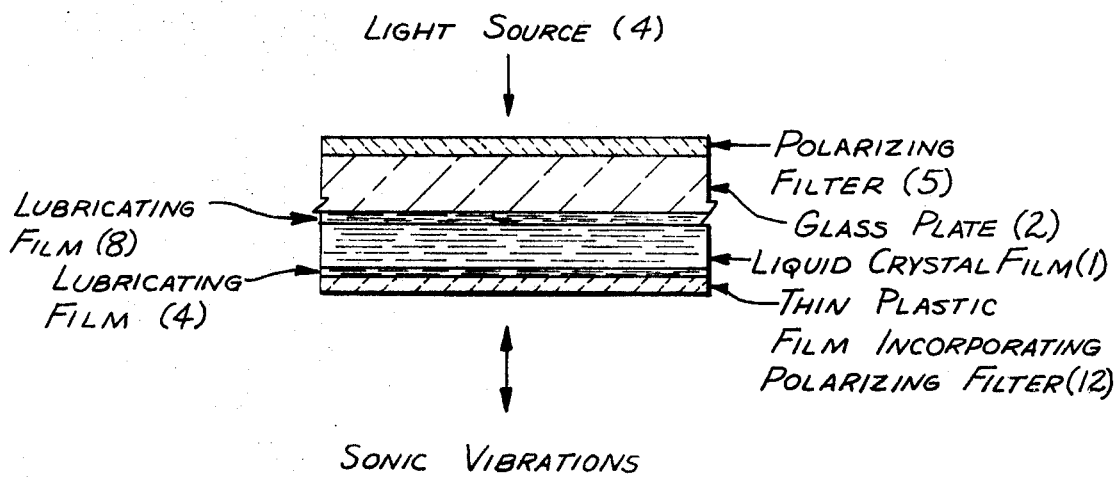
FIG. 4 is a schematic sectional view of an optical element wherein one of the supporting plates comprises a piezoelectric material.

Still another combination is illustrated in FIG. 4 wherein the supporting surface on the viewing side of the element comprises a thin plastic sheet 12 which may incorporate a polarizing filter, the plastic sheet acting as a diaphragm sensitive to acoustic vibrations. The acoustic vibrations will be transmitted by the plastic sheet to the liquid crystal film as mechanical vibrations effective to induce motion patterns in the film. Readily identifiable motion patterns can be produced by varying the amplitude of the acoustic vibrations, the skilled observer thereby being able to effectively read sound. In a modification, the polarizing filter can be separated from the optical element and provided in the form of spectacles to be worn by the observer. Thus, coded motion patterns could be generated which would be visible only to a viewer equipped with a polarizing filter.

It is also within the spirit and purpose of the invention to incorporate various particles in the liquid crystal film to cause it to respond with greater sensitivity to outside influences. For example, iron particles or iron oxide particles incorporated in the liquid crystal compound will produce a response from a magnetic field; and either dielectric or metallic particles of correct size (resonance frequency) will respond to a corresponding frequency. In each case, the particles act as transducers effective to convert the applied energy forms into mechanical energy resulting in physical movement of the liquid crystal film, or portions thereof, depending upon the area involved. Similarly, one supporting surface can be made from a thin plate of magnetic responsive iron which is under the influence of an electromagnet; or a nonmetallic plate, such as glass or plastic, can be fastened to an iron member which is under the influence of an electromagnet. Alternatively, one or both of the supporting plates may be operatively connected to a source of electricmechano energy, such as a piezoelectric material.

Figure 5:
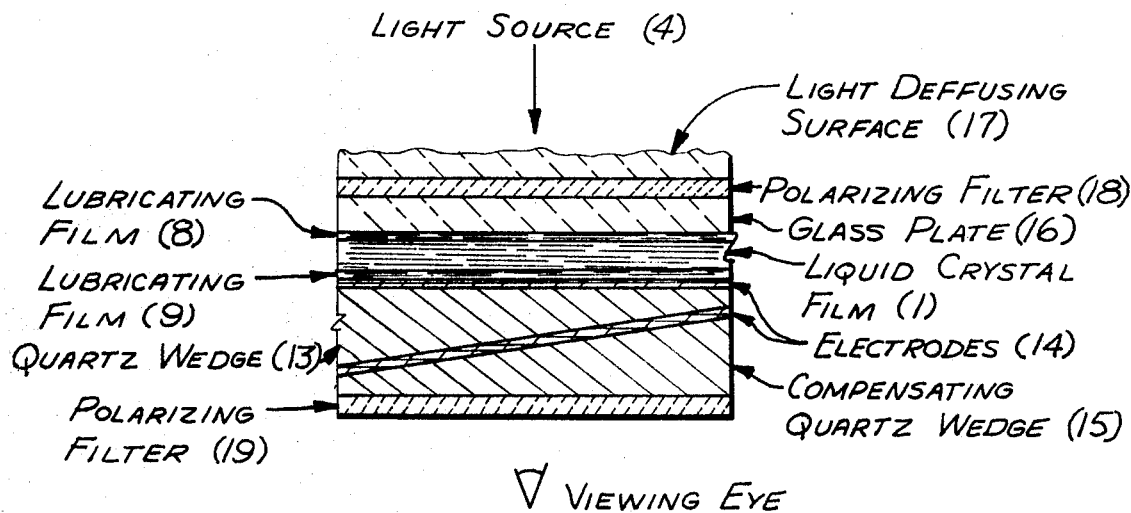
FIG. 5 is a schematic sectional view of an optical element wherein one of the supporting plates comprises a diaphragm responsive to acoustic vibrations.

In the embodiment of the invention illustrated in FIG. 5, a piezoelectric material in the form of quartz wedge is utilized as one of the supporting plates for the liquid crystal film. As seen therein a quartz wedge 13 takes the place of the transparent plate on the viewing side of the liquid-crystal film 1, with transparent electrodes indicated at 14, formed from a material such as tin oxide, juxtaposed between the upper surface of wedge 13 and lubricating film 9 and between the inclined surface of the wedge 13 and a compensating quartz wedge 15 which acts to straighten thru, i.e., the compensating wedge acts to remove the wedge character of the assembly and hence maintain the light rays in a straight path without being bent as they pass through the device. In the illustrated embodiment, the opposing support plate 16 has a light diffusing surface 17 which may be conveniently formed by sandblasting the exposed surface of the plate, and in this instance the polarizing filter 18 is integrally incorporated in the plate 16. As will be understood, a second polarizing filter 19 is provided on the viewing side of the element unless, of course, the liquid crystal film 1 is dichroic, in which event the second filter may be eliminated. With such arrangement, variable voltages may be applied through the electrodes 14 to produce variable motion patterns in the liquid crystal film.

It will be understood, of course, that in each of the embodiments described, the supporting plates will be mounted in a frame or other support which will permit them to move under the influence of the applied mechanical energy. Frames formed from rubber or other resilient material serve nicely for such purpose, or the frames or other plate supporting structure may be rigid with the interposition of pads of a yieldable material supporting the plates from the frames.

As should now be evident, numerous modifications may be made in the invention without departing from its spirit and purpose. Various modifications have already been disclosed, and others will occur to the skilled worker in the art upon reading this specification, it being understood that the particular construction of any given optical element will vary depending upon the specific character of the nematic compound or mixtures thereof from which the liquid crystal film is formed, together with the specific nature of the supporting plates and whether or not it is desired to impress predetermined indicia over the motion patterns generated in the liquid crystal film.

In the claims which follow, it is to be understood that the term nematic liquid crystal film is intended to cover both thermotropic and lyotropic compounds, and includes the cholesteric compounds, which comprise a special order of the nematic compounds. Similarly, as to the thermotropic compounds, it is to be understood that such compounds will be in that particular temperature range in which the nematic mesophase is exhibited.

The embodiments of the invention in which an exclusive property or privilege is claimed are defined as follows:

I claim:

1. An optical display device comprising a nematic liquid crystal film having a thickness of about 10 mils or less supported between a pair of plates at least one of which is transparent or translucent, a lubricating film on the surface of at least one of said plates in contact with said liquid crystal film, and means connected to the assembly so formed for moving said liquid crystal film relative to said supporting plates, whereby a change in birefringence is induced in said liquid crystal film.

2. The optical display device claimed in claim 1 wherein said lubricating film comprises a cationic wetting agent.

3. The optical display device claimed in claim 1 wherein a lubricating film is on the surface of each of said plates in contact with said liquid crystal film.

4. The optical display device claimed in claim 1 wherein a light polarizing filter is associated with at least one of said supporting plates.

5. The optical display device claimed in claim 4 wherein both of said supporting plates are transparent or translucent, and wherein a light polarizing filter is associated with each of said supporting plates.

6. The optical display device claimed in claim 1 wherein one of said supporting surfaces has a light reflecting surface facing said liquid crystal film.

7. The optical display device claimed in claim 1 wherein the means for moving said liquid crystal film comprises means connected to one of said supporting plates for effecting movement of said last named plate relative to the other of said plates.

8. The optical display device claimed in claim 7 wherein the said plate moving means comprises a means for converting electric or magnetic energy into mechanical energy.

9. The optical display device claimed in claim 1 wherein the means for moving said liquid crystal film comprises a means responsive to acoustic vibrations.

10. The optical display device claimed in claim 9 wherein the means responsive to acoustic vibrations comprises one of said supporting plates, said last named plate comprising a sheet sensitive to acoustic vibrations and acting as a diaphragm.

11. The optical display device claimed in claim 9 wherein the means responsive to acoustic vibrations comprises particles dispersed in said liquid crystal film which are of a size to be responsive to acoustic vibrations.

12. The optical display device claimed in claim 1 wherein the means for moving said liquid crystal film comprises metallic particles dispersed in said liquid crystal film, said particles being responsive to an applied source of electric or magnetic energy.

13. A method of effecting a change in birefringence of a nematic liquid crystal film which comprises the steps of supporting said film between plates at least of which is transparent or translucent, including the step of interposing a film or lubricant between at least one of said supporting plates and said liquid crystal film, an d moving said liquid crystal film relative to said supporting plates, 14. The method claimed in claim 13 including the step of inducing relative movement of said supporting plates by converting electric or magnetic energy to mechanical energy, and applying said mechanical energy to one of said plates.

15. The method claimed in claim 13 including the step of inducing relative movement of said plates by making one of said plates a diaphragm responsive to acoustic vibrations, and applying a source of acoustic energy to said last named plate.

16. The method claimed in claim 13 including the step of providing a light polarizing filter on one side of said liquid crystal film.

17. The method claimed in claim 16 including the step of providing a light polarizing filter in the other side of said liquid crystal film.

18. The method claimed in claim 13 including the step of providing the other of said plates with a reflective surface facing said liquid crystal film.

19. The method claimed in claim 13 including the step of forming a surface oriented pattern on the inner surface of a plate which is transparent or translucent.

UNITED STATES PATENT OFFICE
CERTIFICATE OF CORRECTION

Patent No. 3,597,043  Dated August 3, 1971

Inventor(s) John F. Dreyer

It is certified that error appears in the above-identified patent and that said Letters Patent are hereby corrected as shown below:

Column 6, line 44 (line 3 of claim 13), after "at least" insert - one -.

Signed and sealed this 2nd day of May 1972.

(SEAL)
Attest:

EDWARD M. FLETCHER, JR.　　　　　　　ROBERT GOTTSCHALK
Attesting Officer　　　　　　　　　　　Commissioner of Patents